United States Patent [19]

Scarola et al.

[11] Patent Number: 4,663,576
[45] Date of Patent: May 5, 1987

[54] AUTOMATIC CONTROLLER FOR MAGNETIC JACK TYPE CONTROL ROD DRIVE MECHANISM

[75] Inventors: Kenneth Scarola, Windsor; Joseph E. Burns, III, Ellington, both of Conn.

[73] Assignee: Combustion Engineering, Inc., Windsor, Conn.

[21] Appl. No.: 728,727

[22] Filed: Apr. 30, 1985

[51] Int. Cl.⁴ .............................................. G05B 19/40
[52] U.S. Cl. .................................... 318/685; 318/696; 318/135
[58] Field of Search ....................... 318/696, 685, 135; 368/66

[56] References Cited

U.S. PATENT DOCUMENTS

| | | | |
|---|---|---|---|
| 4,074,179 | 2/1978 | Kuo et al. | 318/696 |
| 4,216,648 | 8/1980 | Maire | 368/66 |
| 4,351,039 | 9/1982 | Berney | 368/76 |
| 4,381,481 | 4/1983 | Kuppern et al. | 318/696 |

*Primary Examiner*—William M. Shoop, Jr.
*Assistant Examiner*—Saul M. Bergmann
*Attorney, Agent, or Firm*—John H. Mulholland

[57] ABSTRACT

Apparatus and method are disclosed for continually generating data values (M) indicative of the time dependent waveform of the current ($I_C$) in a control rod latch actuation circuit (28), during application of a pulsed drive voltage (30). A data value is selected that represents a value limit ($M_{min}$) characteristic of the waveform during the time before the latch (14) has reached a critical position of interest. The most recently generated data value ($M_N$) is compared to the value limit ($M_{min}$), and a control signal (e.g., 74, 52, LH) is generated when the most recently generated data value ($M_N$) exceeds the value limit ($M_{min}$). The data values (M) preferably indicate the time derivative of the waveform ($I_C$) at a plurality of predetermined times during application of the drive voltage. Latch movement to the critical position is indicated when the algebraic value of the waveform time derivative exceeds, by a predetermined setpoint, the minimum algebraic value computed at regular time intervals during application of the drive voltage.

17 Claims, 20 Drawing Figures

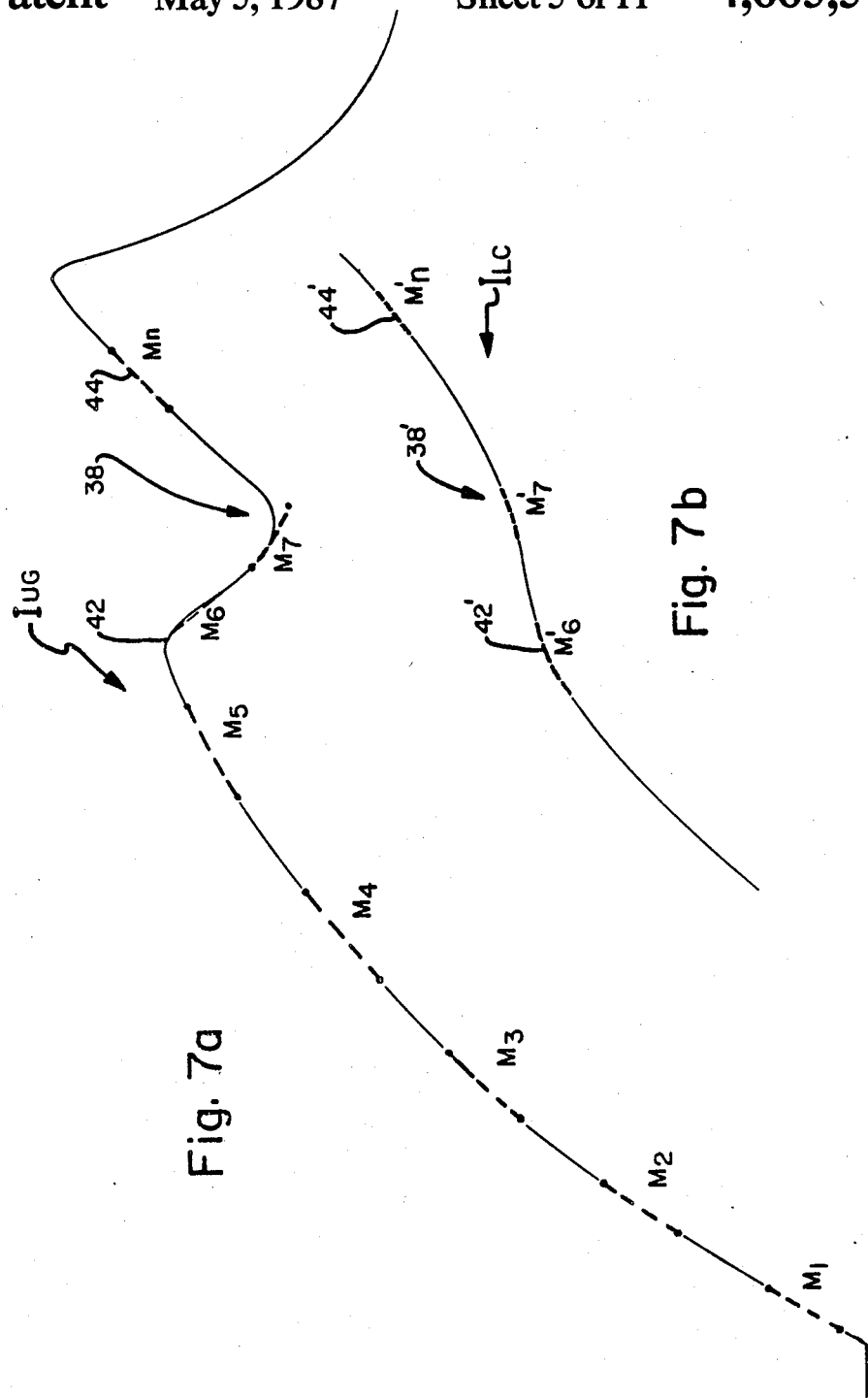

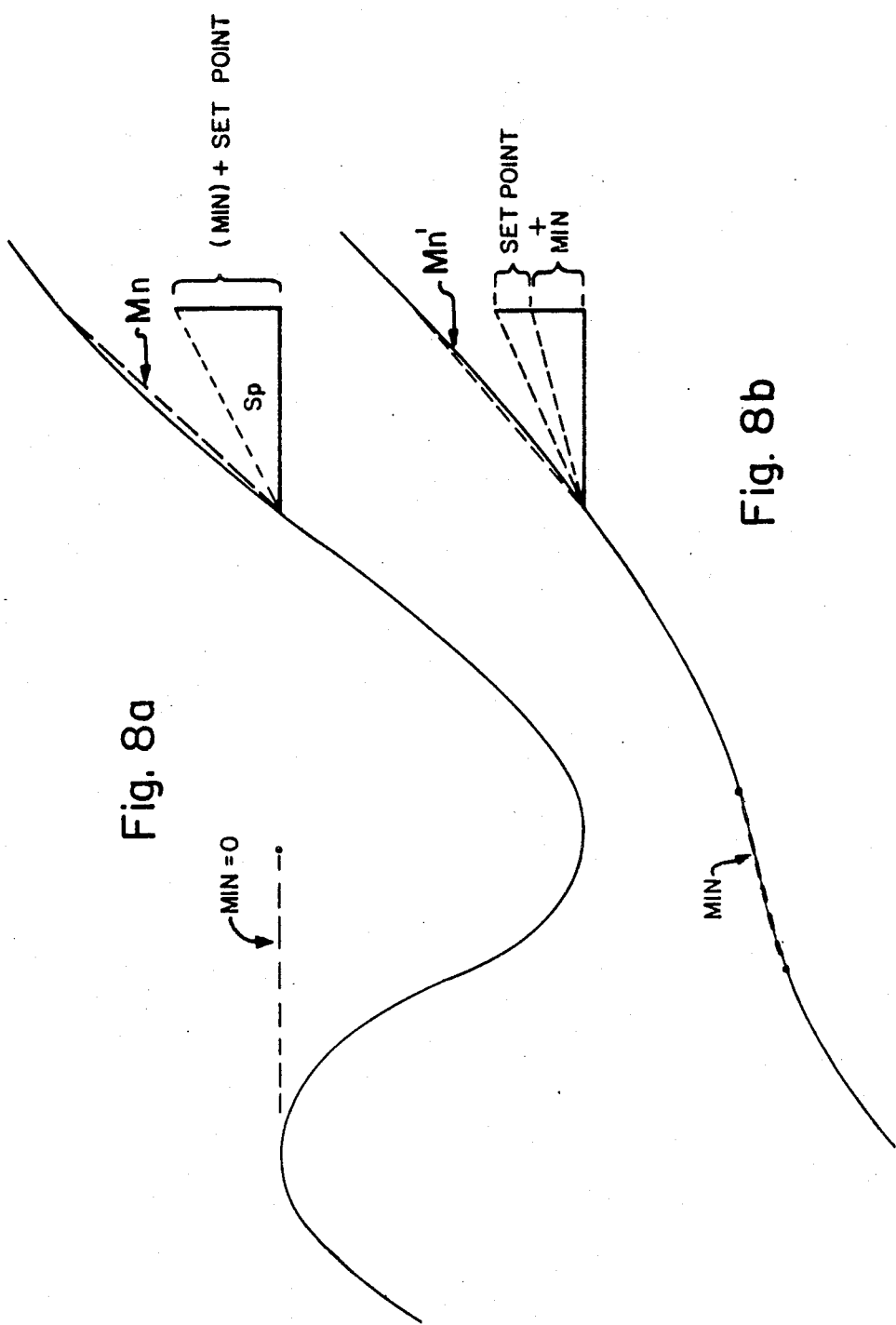

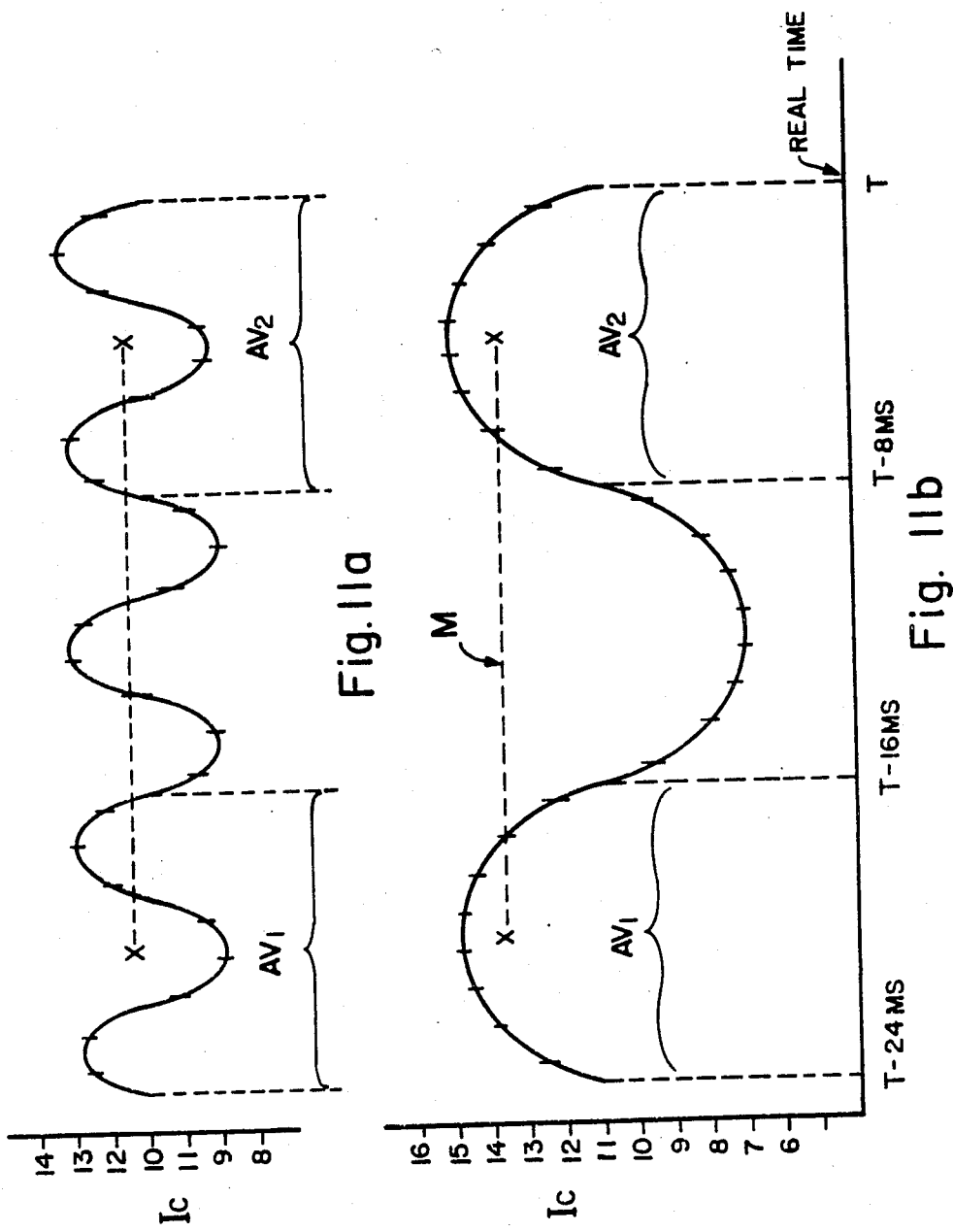

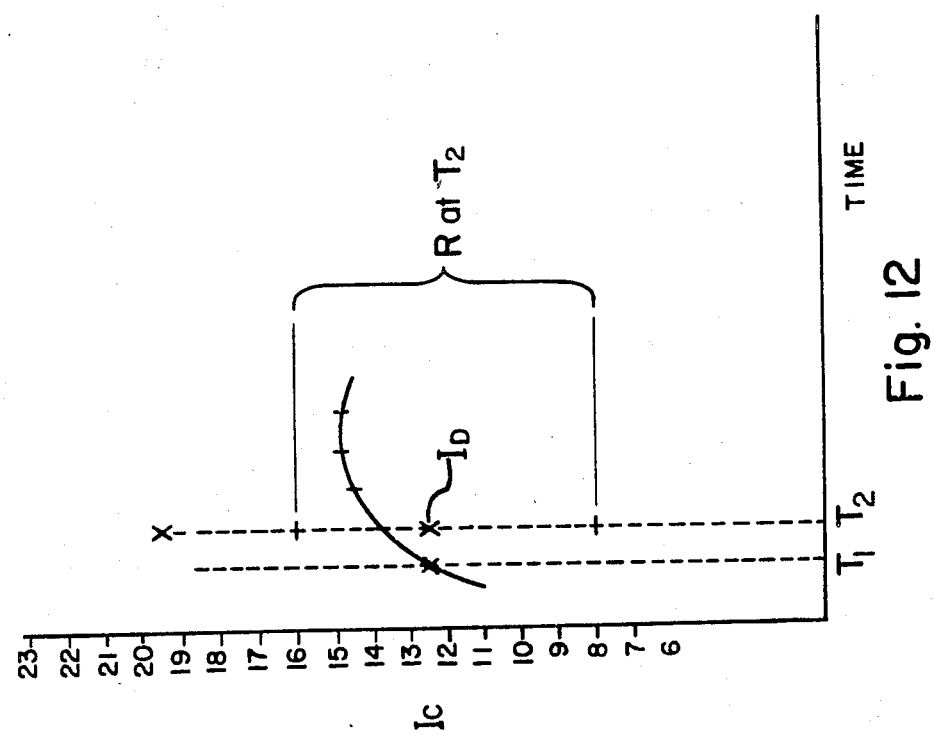

AUTOMATIC CONTROLLER FOR MAGNETIC JACK TYPE CONTROL ROD DRIVE MECHANISM

BACKGROUND OF THE INVENTION

The present invention relates to stepping-type magnetic mechanisms and, more particularly, to control rod drive mechanisms of the magnetic-jack type.

Commercial nuclear power reactors are typically controlled by the movement of one, or groups of several, neutron-absorbing control rods into or out of the reactor core. A variety of electromechanical devices have been employed or proposed for driving the control rods but two types are most often used today. In the first type, the control rod drive shaft has a plurality of notches extending along its upper portion. A plurality of latch members are actuated in sequence to engage, hold, lift (or lower), and reengage the notches, to withdraw (or insert) the control rod vertically with respect to the core. In the other type, the upper portion of the control rod drive shaft is screw-threaded in mating engagement with a nut member, which is in sequentially rotated to either lift or lower the control rod with respect to the core. In both types of control rod drive mechanisms, the sequential actuation of the latch members or nut rotations, is accomplished step-wise by electromagnetic inductance devices.

Control rod movement usually results in significant reactivity changes in the core, which can increase or decrease the gross power level and affect the local power generated by the individual fuel elements within the core. The accuracy of control rod position indication is an important determinant of the maximum power level at which the reactor can be legally operated. Moreover, if the control rods cannot be controlled precisely enough to assure accurate location in the core and accurate positioning relative to each other, significant operating limitations on the power plant are imposed by law. Operators of nuclear plants thus have a strong incentive to install control rod drive systems that are reliable and rugged, yet maintain maximum accuracy under all normal environmental conditions.

Electromechanical devices of the type described above, have required complex timing schemes and extensive need for calibration, maintenance, and setpoint determination. Even with the best of care, however, power plant operators have lost valuable time and suffered considerable expense when the actual position of the control rods differed signficantly from the positions they should have been in had the drive mechanisms operated flawlessly. For example, position indication was typically inferred from the electrical pulse signals issued to the latch coils. If the latch did not move despite actuation of the coil, the operator's position indication would show an increment in the rod position, even when rod remained stationary. When accumulated over a period of continuous plant operation, such occasional misoperation nevertheless reduced the reliability of the control system, and power plant operation generally.

U.S. Pat. No. 4,125,432, "Drive Mechanism Nuclear Reactor Control Rod", discloses an improvement to earlier drive mechanisms, whereby actual mechanical motion of the control rod gripper latch is detected and utilized in the control and monitoring logic. Previous systems relied upon detection of the latch motion actuation current to infer rod motion. In essence, the method of the '432 patent included the steps of sensing the current level in the drive coil that operated the latch armature, then comparing the waveform of the coil current to at least one waveform characteristic of the coil when the latch is at rest. Thus, the start of latch movement was evident from the deviation of the coil waveform from the waveform characteristic of the stationary latch, and detection of the end of latch movement was evident from the resumption of a coil waveform similar to that characteristic of a stationary latch.

A number of control system improvements potentially available from the teachings of the '432 patent were recognized at that time. Coil lifetime could be improved because the peak current could be limited to that required to cause the latch to start moving; excessive latch wear and coil burnout were thus prevented. By directly monitoring the actual latch movement, individual movements could be accumulated to determine actual rod position in the core. Also, incipient failures could be detected by determining whether the elapsed time between the application of drive voltage and the receipt of the indication that the latch was moving, exceeded a known limit. Finally, the indication of failure of one latch to move as required, could be used to prevent actuation of the other latches associated with the drive mechanism, thereby assuring that the control rod is supported at all times.

Although many advantages relative to the prior art were theoretically available from the invention described in the '432 patent, the practical implementation has not been easy. Two significant difficulties have been encountered. First, the "characteristic waveforms" to which the coil current waveforms are to be compared, are unique to each of several kinds of coils on each drive mechanism, and they differ from mechanism to mechanism. One nuclear reactor may have up to one hundred such mechanisms. Also, the "characteristic waveform" changes in time as the mechanical components of the mechanism are affected by wear and temperature variations. A second obstacle to implementation has been the effect of electromagnetic interference (EMI) on the detection and accurate representation of the current waveforms associated with the coils. The difficulty of accurately determining the coil waveform, coupled with the large number of constantly changing and subtley different "characteristic waveforms" serving as references, presented a considerable obstacle to the design of a cost-effective control rod drive and monitoring system in which all the advantages described in the '432 patent could be achieved.

One of the advantages available from the invention set forth in the '432 patent was, however, implemented in the form of a Gripper Engagement Monitor (GEM) developed by Combustion Engineering, Inc. for use at Songs Units 2 and 3, of the Southern California Edison Company, and at the St. Lucie Number 2 Unit of the Florida Power & Light Company. The GEM circuit detected mechanical motion of the upper and lower grippers by electronically monitoring the gripper coil current waveforms, and provided a gripper interlock such that one of the two grippers would always engage the control rod. When a failure of a gripper to engage was detected, the normal disengagement of the opposite gripper was prevented. Upon such failure, the preprogrammed operating sequence of the control rod timer board was interrupted and the operator recognized that corrective action would be required. The GEM circuit was not used as a controller, but merely as a protection device to notify the operator of a particular malfunction (i.e., failure of a latch to engage).

Although the GEM circuit offered modest improvement relative to the control rod monitoring systems then available, it did not provide most of the advantages available from the invention of the '432 patent. The problems discussed above relating to the large number and wide variety of current wave forms associated with the multiplicity of control rod drive mechanisms for a typical nuclear reactor, as well as the EMI effects, were not overcome by the GEM circuit. By means of a hard-wired (operational amplifier) circuit, the GEM could detect latch engagement only for the subset of required latch movements that produce a coil current waveform having a very pronounced shape irregularity, or "glitch", during latch movement. These waveform types are associated with latch engagement, but not with the control rod lifting, or latch pulldown motions which are also required to be performed during the course of a complete latch sequence cycle. Thus, the GEM circuit could not be used to improve timing control and to monitor the satisfactory operation of all the coils associated with the full control rod drive system.

Accordingly, although the invention of the '432 patent was a significant advance in the state of the art at the time such invention was made, and it provided the underpinnings for the GEM circuit which implemented some of the advantages available therefrom, a complete and cost-effective implementation was still needed.

SUMMARY OF THE INVENTION

The present invention is directed to a significant extension and improvement of the technique set forth in U.S. Pat. No. 4,125,432, and has been demonstrated to achieve many of the advantages set forth therein. Fundamentally, the present invention compares the waveform of the current level in the coil circuit to a waveform that is characteristic of the circuit when the latch armature is at rest, for indicating whether the current waveform is departing from the shape of the waveform when the armature is at rest. Rather than storing an extremely large number of "characteristic waveforms" to which the real-time waveform would be compared, the present invention uses as the characteristic waveform, data values indicative of the actual waveform sensed during an earlier portion of the coil activation pulse.

In the apparatus embodiment, the invention includes means for continually generating data values indicative of the time dependent waveform of the current level in the latch actuation circuit, during application of the drive voltage in a given actuation pulse. The apparatus also includes means for selecting and storing one of the data values as representing a value limit characteristic of the waveform during the time before the armature or latch has reached the critical position of interest. Means are provided for comparing the most recently generated data value to the value limit, and then generating a control signal when the most recently generated data value exceeds the value limit. In the illustrated embodiment, the data values indicate the time derivative of the waveform at a plurality of predetermined times during the application of the pulsed drive voltage. Preferably, the indication of latch movement to the critical position is determined when the algebraic value of the waveform time derivative exceeds, by a predetermined setpoint, the minimum algebraic value of the derivative computed at regular time intervals during application of the drive voltage to the coil associated with the latch.

The method embodiment of the invention includes the steps of generating a drive voltage across the coil sufficient to cause an associated armature latch to move from a predetermined initial position to a predetermined final position, and sensing the current waveform produced in the coil by the drive voltage. The time derivative of the current waveform is continually monitored at each of a plurality of time points during the application of the drive voltage. The minimum algebraic value of the time derivative of the current waveform is continuously stored. The algebraic value of the present, or real-time derivative of the current waveform is then compared to the stored value, and a control signal is generated when the algebraic difference between the present value and the stored value exceeds a predetermined setpoint.

In the illustrated embodiment, the waveform data values are generated from digital representations of the current waveform and means for averaging the digitized representations over each of a preselected plurality of time intervals. Also, means are preferably included for limiting the magnitude of the deviation of any digitized representation relative to a preceding digitized representation of the waveform. Both these features contribute to minimizing the effects of EMI on the data values used for comparing the real-time and stored data values. Particulary when a three-phase power source is used to generate the drive voltage, averaging the digitized waveform over preselected time intervals maintains reasonable accuracy even if the three-phase power becomes unbalanced.

The present invention thus provides improved overall control rod drive system reliability. The ability to positively detect latch motion associated with every coil type in a given control rod drive mechanism, permits full realization of the improved voltage pulse and timing sequence advantages discussed in the '432 patent. Coil and electronics life are increased, and the number of manual adjustments to the electromechanical circuits and linkages required with present designs can be signficantly decreased. Control rod position and, thus, reactivity control can be more accurately determined and the operating flexibility of the unit can be increased. Furthermore, the ability to more accurately time the sequential coil actuation and latch movements permits an increase in the shaft drive speed. Also, the timing and strength of the coil currents can be adjusted for unique circumstances, such as the reengagement and initial lifting of a control rod that was previously released during a plant trip.

BRIEF DESCRIPTION OF THE DRAWINGS

The preferred embodiments of the invention and the best mode for carrying them out, are more fully described below with reference to the accompanying drawings, in which:

FIGS. 7a and 7b are schematic illustrations of how the waveform derivative is determined at preselected intervals during the time when voltage is applied to the coil, for a gripper coil, and a lift coil, respectively;

FIGS. 8a and 8b illustrate schematically the determination of the waveform derivative in the portion of the waveform associated with the completion of movement of the latch or armature to the critical position of interest, for a gripper coil and a lift coil, respectively;

FIGS. 11a and 11b illustrate schematically the preferred technique for obtaining the time averaged data values for the coil current waveforms, when the power source is balanced and unbalanced three-phase, respectively;

FIG. 12 illustrates schematically how the preferred technique for digitizing the current waveform adjusts for data values that deviate so far from the immediately preceding values, that they are considered noise;

DESCRIPTION OF THE PREFERRED EMBODIMENT

The present invention will be described in the preferred embodiment, which is a control rod drive mechanism and system, of the type having mechanical operations generally described in a number of prior U.S. patents, such as U.S. Pat. Nos. 3,626,493 (Behmke), 3,765,585 (Ruoss), and 4,125,432 (Brooks et al.), the disclosures of which are hereby incorporated by reference.

Figure 1:
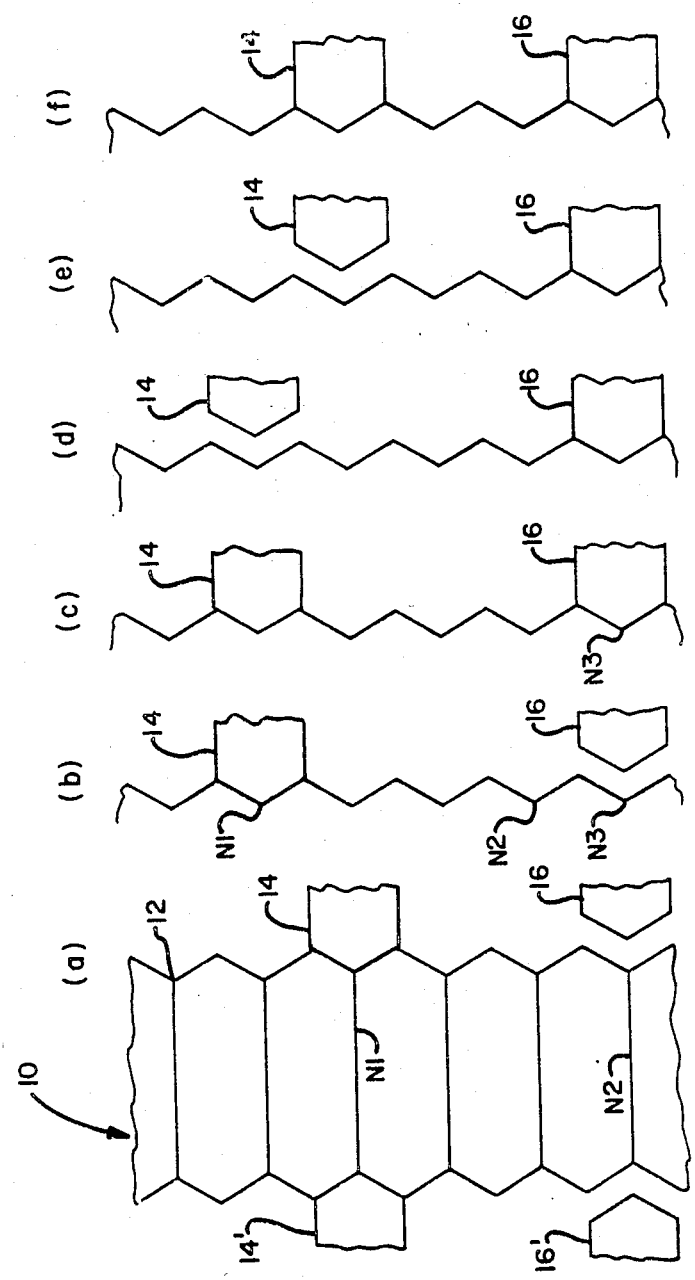
FIG. 1 is a schematic representation of a control rod drive shaft and associated upper and lower latches, illustrating the sequential engagement, holding, lifting, and pulldown operations required to longitudinally advance the control rod.

FIG. 1 shows a drive shaft 10 having a series of equally spaced notches 12, which are engagable by upper latch or gripper 14, 14' and lower latch or gripper 16, 16'. FIG. 1a shows the drive shaft 10 with upper latches 14, 14' engaging an arbitrary notch N1 and lower latch 16, 16' spaced from and at the same elevation as notch N2. The present invention is directed to an apparatus and method for monitoring and controlling the sequential operation of latches 14, 16 so as to reliably and accurately move the drive shaft 10 upward or downward into the core of a nuclear reactor. It will be evident to those skilled in the art of electromechanical devices, however, that the apparatus and method disclosed and claimed herein, may be beneficially employed in a wide variety of other devices where a similar step-wise function is performed.

Figure 2:
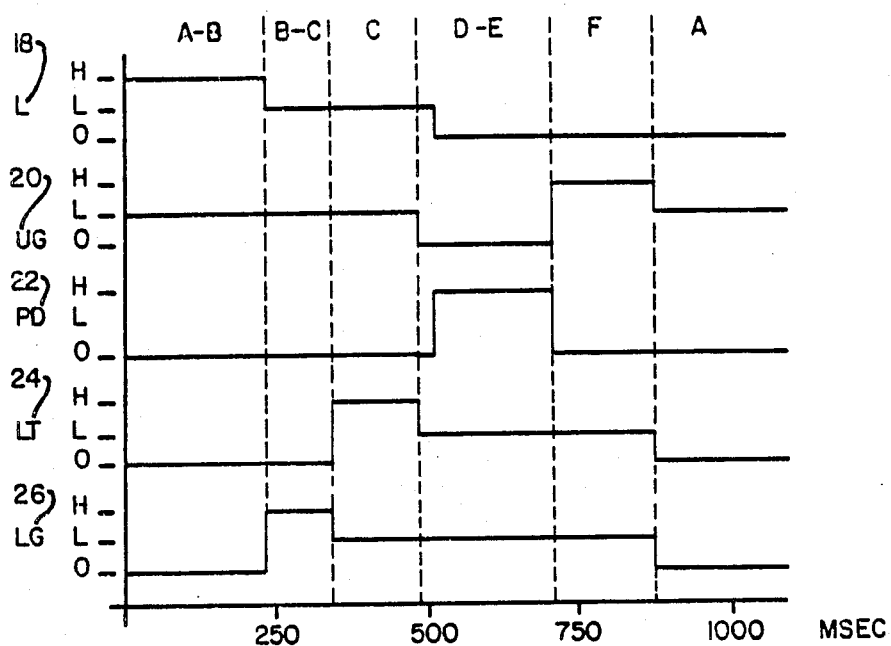
FIG. 2 is a typical timing chart in accordance with the invention, illustrating schematically the drive voltage pulses applied to the inductance coils that are magnetically coupled to the latches as shown in FIG. 1.
Figure 3:
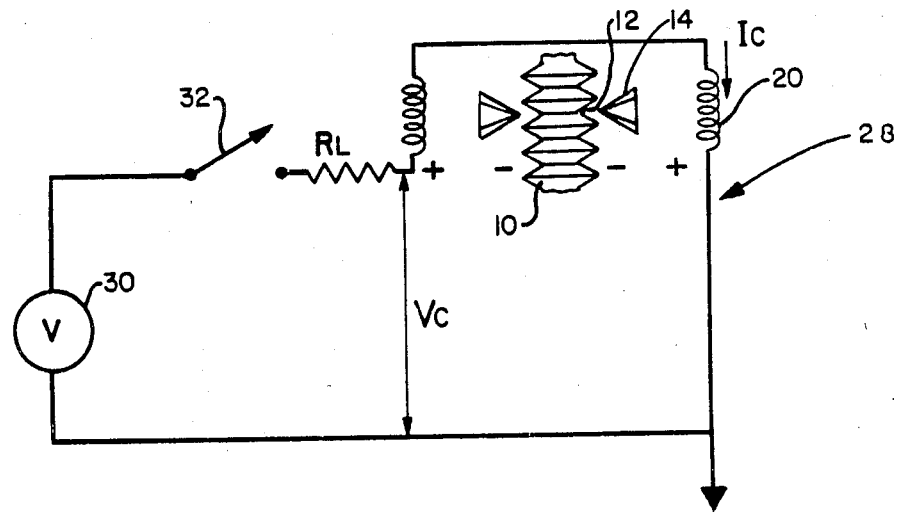
FIG. 3 is a hybrid circuit schematic showing the relationship among the drive voltage source, inductance coil, latch armature, and inductor current, for one of, typically, five actuation coils associated with a single control rod drive mechanism.

FIGS. 1, 2 and 3 when taken together, illustrate the electromechanical sequence of actions for moving the control rod drive shaft 10. In accordance with the present invention, the preferred timing of the sequential actions represented in FIG. 2 can be accomplished with great precision and reliability, while minimizing the wear on the latch and the coil, due in large part to the precise interpretation of the electrical signals generated within the coil drive circuit shown schematically in FIG. 3. Although a single drive shaft 10 may have only two pair of latches 14, 14', and 16, 16', the advancement of the drive shaft typically requires five separate types of latch actuations, each of which may be represented by the coil actuation circuit shown in FIG. 3.

With reference to FIGS. 1 and 2, at time zero, a high voltage H is applied to lift coil 18. This supplements the mere holding effect of the upper gripper coil 20 on upper latch 14, which carried the stationary weight of the shaft 10 at time zero. When sufficient current builds up in lift coil 18 due to the high step voltage, the upper gripper 14 is displaced upward, as is notch N1 and the entire drive shaft 10. This position is shown in FIG. 1b and the operation occurs during the time interval labeled A-B in FIG. 2. During the period A-B, the other coils in the drive mechanism have the following states: the upper gripper coil 20 is energized to a low, or "holding" voltage L, the pulldown coil 22 is deenergized to voltage 0, load transfer coil 24 is deenergized to 0, and the lower gripper coil 26 is also deenergized.

The actuation of the latch 14 is schematically represented in FIG. 3 by the coil circuit 28 having a voltage power source 30, typically a three-phase power source, a switch 32, circuit equivalent resistance $R_L$, and an inductance coil arrangement whereby the upper grippers or latches 14 are positioned as armatures within the magnetic field of the upper gripper coils 20 such that the latches 14 move inwardly towards the adjacent notch 12 on the drive shaft 10 upon passage of sufficient current $I_C$ through the coils. The latches 14 are typically mechanically biased to spring back in full disengagement from the drive shaft 10 upon the deactivation of the coils 20, as more fully described in the disclosures of the patents incorporated by reference. Lift coils 18 and pulldown coils 22 are arranged to move the upper latch 14 upward or downward relative to the lower latch 16. The arrangements of the coils and the details of their interaction with the mechanical members of the drive mechanism may be found, for those interested readers, in the incorporated references.

For purposes of a full understanding of the present invention, however, one skilled in the art need only understand that as each of the coils indicated in FIG. 2 is required to energize or deenergize, a resulting current $I_C$ passes through, and a resulting voltage difference $V_C$ is generated across, the energized coil.

With respect to the timing sequence shown in FIG. 2, the next event, at about 250 ms, is the simultaneous actuation and engagement of the lower gripper coil 26 to move the lower latch 16 into engagement with its opposing notch N3, and to reduce the voltage in the lift coil 18 to an intermediate level L corresponding to a holding, rather than lifting function. This event is shown in FIG. 1c, and the time interval is represented by B–C in FIG. 2.

Once the lower gripper 16 is fully engaged and the voltage is reduced to a low level, the weight or load of the drive shaft 10 is transferred to the lower gripper by energizing the load transfer coil 24, as represented during the time interval C in FIG. 2. Upon confirmation that the load has been transferred and is being held by the lower gripper 16, the lifting coil 18 and upper gripper coil 20 are deenergized, and the pulldown coil 22 is energized to pull the upper latch 14 downward the equivalent of one notch position. This occurs during time interval D–E in FIG. 2, and the resulting relationship of the upper and lower latches 14, 16 are shown in FIGS. 1d and 1e. The upper gripper coil 20 is then energized to effect latch engagement as shown in FIG. 1f, so that, for a moment, both the upper gripper 14 and lower gripper 16 engage and support the control rod shaft 10. This is shown in time interval F in FIG. 2. During time interval A shown in FIG. 2, the lower gripper coil 24 is deenergized, as are all other coils except the upper gripper coil 20. The upper latch 14 and lift coil 18 are thus poised for actuation as shown at interval A–B, to repeat the shaft lifting cycle.

As may be appreciated from inspection from FIG. 2, the timing of the various coil actuations is critical, particularly at those time points when the load is being transferred between the upper and lower grippers. Another factor leading to the criticality of the timing is the use of two energized voltage states, high and low, the high being used to engage or lift as required, and the low voltage being used merely to hold the gripper in position. This is desired, as described in U.S. Pat. No. 4,125,432 to increase coil and latch lifetime. In actual practice, as will be discussed below, the coil current associated with the high and low actuated states, is different for each of the five types of coils, the most current being needed for the lift coil 18 to actually move, rather than merely hold, the control rod.

The apparatus and method of the present invention are directed to an improved technique for determining when in fact the latch members 14, 16 have fully engaged the opposing notches 12, or otherwise have moved as desired. A control signal may then be sent to begin the subsequent coil activation without risk that misoperation will cause the rod not to move when called upon, or under the worst circumstances, to drop inadvertently.

Figure 4A:
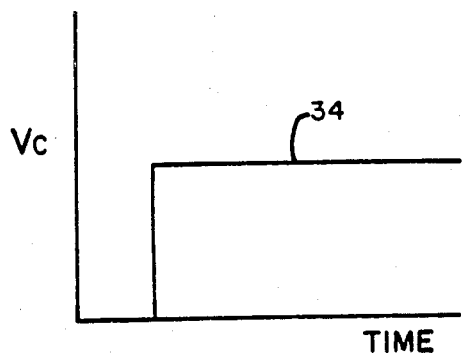
FIGS. 4a and 4b show the voltage and current waveforms associated with the closure of the switch shown in the circuit schematic of FIG. 3, if no latch movement occurs.
Figure 4B:
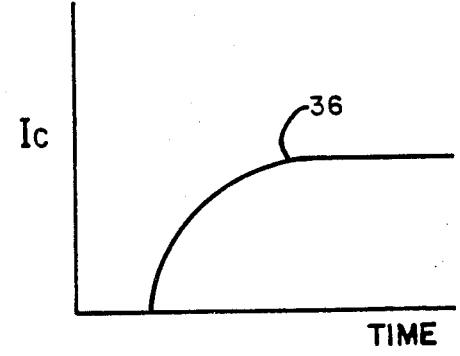

FIG. 4a illustrates schematically the coil voltage 34 ($V_C$) across any of the coils 18–26 from the moment switch 32 is closed and during the time intervals of a constant energized state. FIG. 4b shows the coil current 36 from the moment the switch is closed, assuming the current $I_C$ is insufficient to cause movement of the armature or latch 14 associated therewith. The basis for the present invention, as well as that covered by the '432 patent, is the effect on the current waveform when the latch 14 moves from a first, or initial position to a second position e.g., between full disengagement and full engagement.

Figure 5:
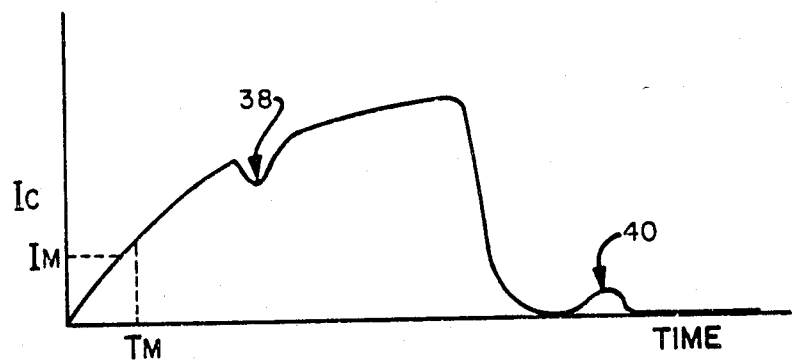
FIG. 5 is a schematic representation of a typical gripper coil current waveform associated with the engagement and disengagement of latch shown in FIG. 3.

FIG. 5 shows the waveform deviation or "glitch" 38 associated with a gripper coil 20, as the latch members 14 move in the minus (−) direction toward the drive shaft 10. A similar, inverted "glitch" 40 occurs when the latches 14 are pulled back toward the coil by the action of springs (not shown). The coil waveform shown in FIG. 5 is merely schematic. As a practical matter, both the waveform shown in FIG. 4b associated with no latch movement whatsoever, and the waveform shown in FIG. 5 representing the energizing and eventual actuation of the latch, do not remain constant even for a particular coil in a particular drive mechanism. The effects of time, wear, and temperature cause these characteristic waveforms to vary. Furthermore, the introduction of EMI into the system further modifies the real-time waveforms.

Figure 6:
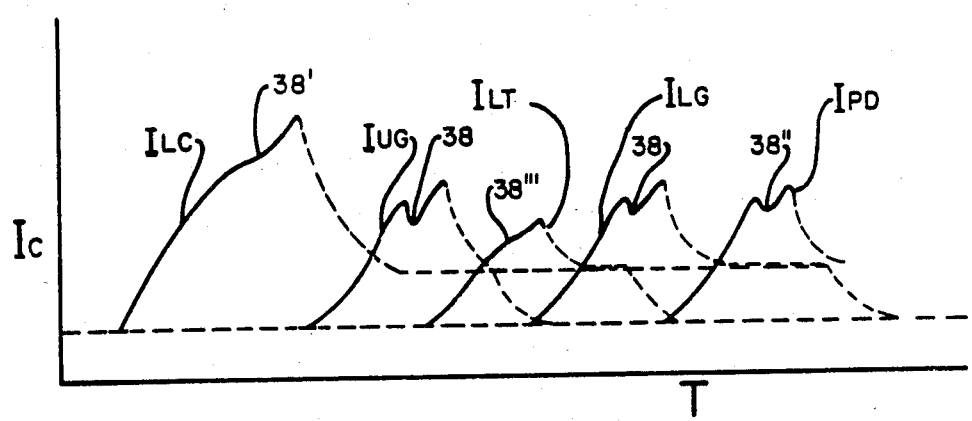
FIG. 6 is a schematic illustration of the relative gross waveform shapes associated with the actuation of the five coil types in a typical control rod drive mechanism.

FIG. 6 shows in a very general way, the overall differences in shape and normalized amplitudes associated with the coil currents in the five types of coils associated with the preferred embodiment. The current having the greatest amplitude is associated with the lift coil 18 and is labeled $I_{LC}$ in FIG. 6. The peak current is permitted to reach about 30 amps before the voltage is reduced and a stable current is maintained by means of the voltage pulse timing shown in FIG. 2. The glitch 38' is quite gradual as compared with that shown in FIG. 5; the slope of the waveform never becomes negative. The waveform associated with the upper and lower gripper coils are labeled $I_{UG}$ and $I_{LG}$, respectively. Both the waveforms and the glitch pattern 38 are similar to those shown in FIG. 5. The waveform associated with the pulldown coil, labeled $I_{PD}$, more closely resembles the waveforms associated with the gripper coils than with the lift coil, but generally has a higher amplitude and a more rounded hump associated with its glitch 38''. The load transfer coil current waveform, labeled $I_{LT}$, more closely resembles, at a significantly lower amplitude, that of the lift coil, but the glitch 38''' is more difficult to discern on an equivalent scale.

Given the circumstances that a unique set of "no motion" and "in motion" waveforms cannot readily be ascertained even for a single coil in a single drive mechanism, it is not surprising that the practitioners in this art would be reluctant to implement a monitoring and control system which required the time dependent and event dependent characterization of every individual coil in a nuclear reactor control rod drive system having a total of approximately 500 coils.

In accordance with the present invention, a novel technique is provided for comparing the waveform of the current level in the coil to a waveform that is characteristic of the coil when the armature is at rest. FIGS. 7a and 7b are enlarged schematics of the interesting portions of the upper gripper coil waveform $I_{UG}$ and the lift coil waveform $I_{LC}$, shown in FIG. 6. In FIG. 7a, the glitch 38 is quite pronounced and passes a point 42 where the waveform slope, or derivative, is zero. Although this portion of the waveform does provide information that the armature has begun moving from its first, stationary position, we have realized that the more significant information appears at point 44. This represents the reestablishment of the basic waveform shape representing a stationary armature, and confirms that the armature or latch has fully engaged in the second position. In FIG. 7b, it may be seen that the equivalent points on the waveform are more difficult to discern, due to the very gradual change in slope of the waveform between the initial and final stationary positions of the armature, indicated at 42' and 44', respectively.

Rather than comparing the real-time current waveforms generated at each voltage pulse, with a complete reference or characteristic waveform, the present invention provides means and follows a method for continually generating data values indicative of the time-dependent waveform of the current level in the circuit 28 during application of the drive voltage 30 (See FIG. 3). According to the preferred embodiment, these data values represent the time derivative of the current waveform at each of a plurality of time points during the application of the drive voltage. In FIG. 7a, each derivative is indicated by the waveform slope $M_1, M_2, \ldots M_6, \ldots M_N$. Similarly, in FIG. 7b, where a smaller portion of the waveform is shown, slope $M_6'$ and $M_N'$ are shown at points 42' and 44' corresponding to points 42 and 44 respectively on FIG. 7a.

Figure 14:
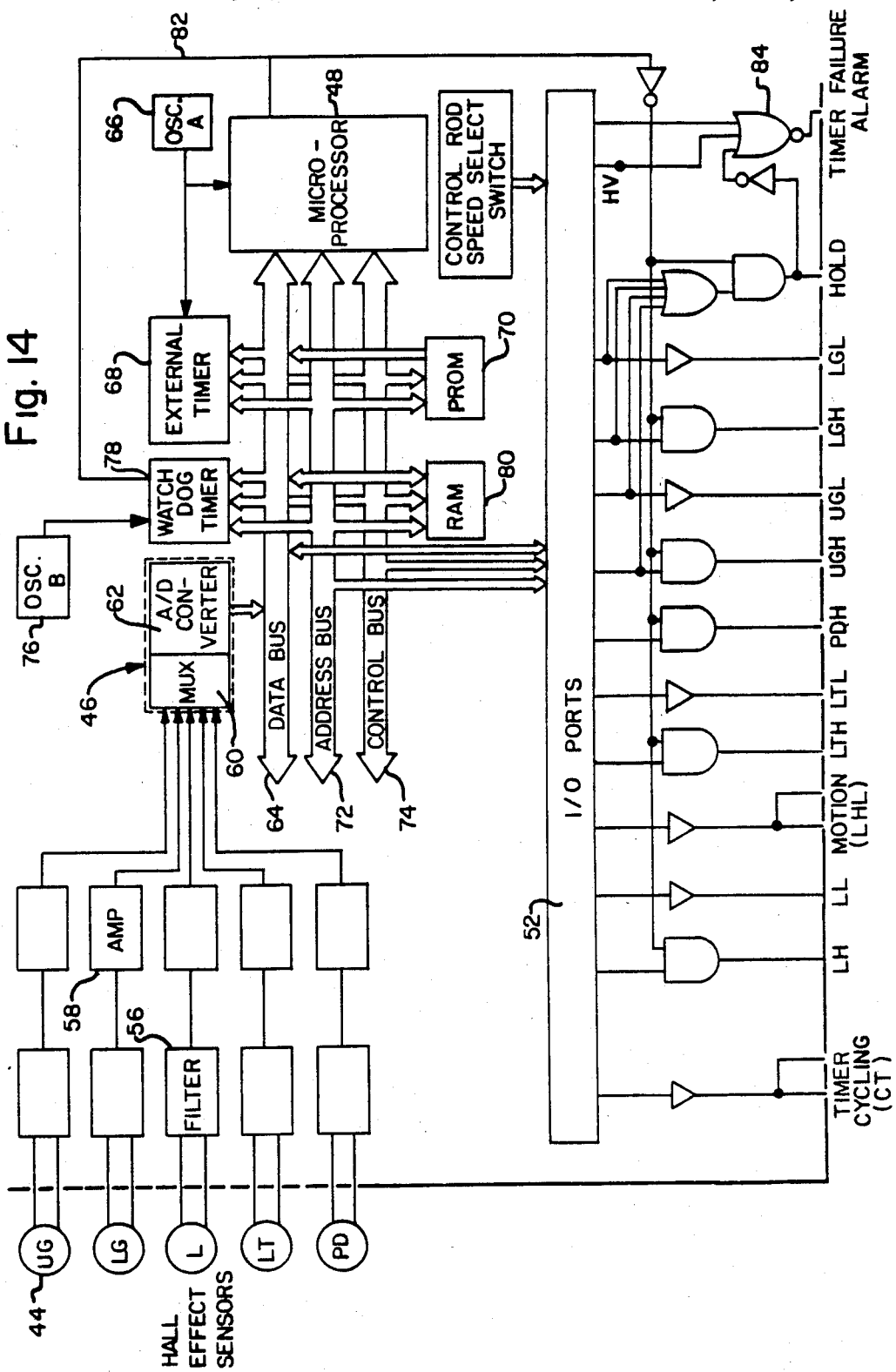
FIG. 14 is a block diagram showing the basic hardware components associated with the preferred embodiment of the invention.

The present invention is preferably implemented in a microprocessor-based system, preferably of the type shown in FIG. 14. The details of the block diagram will be further discussed below, but for present purposes it should be understood that the system includes current sensing means 44 for sensing the current waveform produced in each coil circuit by the drive voltage, signal processing means 46, preferably including means for digitally representing the current waveform at each of a plurality of predetermined times during the application of the drive voltage, and means for averaging the digitized representations over each of a preselected plurality of time intervals, preferably in a microprocessor based control unit 48. The control unit 48 selects and stores one of the data values as representing a value limit characteristic of the waveform during the time when the armature has not reached the critical position, e.g., the fully engaged position. The microprocessor also compares the most recently generated data value to the value limit, and generates a control signal 50 when the most recently generated data value exceeds the value limit. The control signal 50 passes through the output ports 52 whereby the timing and sequencing of the coil voltages are implemented, as shown in FIG. 2.

The basis for the present invention is the discovery that, despite the wide variety of general waveform shapes of the types shown in FIG. 6, and the wide range of glitches 38 appearing on these overall waveforms, the confirmation of actual movement of the latch members 14, 16 from an initial rest position to a final rest position can be achieved by comparing the waveform derivative before and after such movement. More particularly, along the initial current rise of the waveform as shown in FIGS. 7a, 7b, the derivatives $M_1-M_7 \ldots$ decrease in algebraic value, sometimes going negative as shown in the glitch 38 in FIG. 7a, and sometimes never even approaching zero, as shown in FIG. 7b. Regardless of the shape of the waveform up to and during the glitch, when the final position of the latch has been established, as at 44, 44', the waveform derivative is always algebraically greater than the minimum value of the waveform derivative at any preceding point on the waveform.

Thus, the invention tracks and stores, on a continual basis, the derivatives $M_1, M_2, \ldots M_6$, selects as the value limit the derivative having the minimum value, and continually compares the real-time, present value of the waveform derivative with the stored value limit. Thus, with reference to FIG. 7a, the initial stored derivative value would be $M_1$, then $M_2$, through $M_6, M_7, \ldots M_N$. When $M_N$ exceeds, for example, $M_7$, the confirmation of engagement has occurred and a subsequent control signal may be generated. A similar process is performed with respect to the waveform $I_{LC}$ shown in FIG. 7b.

FIGS. 8a and 8b show in greater detail the preferred way of comparing the present value of the waveform derivative with the stored minimum value, during a given coil activation pulse. Since it has been established that the waveform slope corresponding to the armature or latch reaching its final position, always has a positive value, it is convenient to limit the minimum derivative value stored in the comparison memory, to a value of zero. This is shown schematically in FIG. 8a. Thus, the stored derivative values corresponding to slopes $M_6$ and $M_7$ in FIG. 7a, would be zero. In order to assure that premature indication of latch engagement does not occur, a predetermined set point value of slope, $S_P$ is added to the minimum stored value prior to comparison with the real-time slope $M_N$. If $M_N$ exceeds the algebraic sum of the minimum stored value and set point, the control signal is generated. It may be seen that in FIG. 8a, the minimum stored value is zero and in FIG. 8b the minimum stored value is greater than zero.

Figure 9:
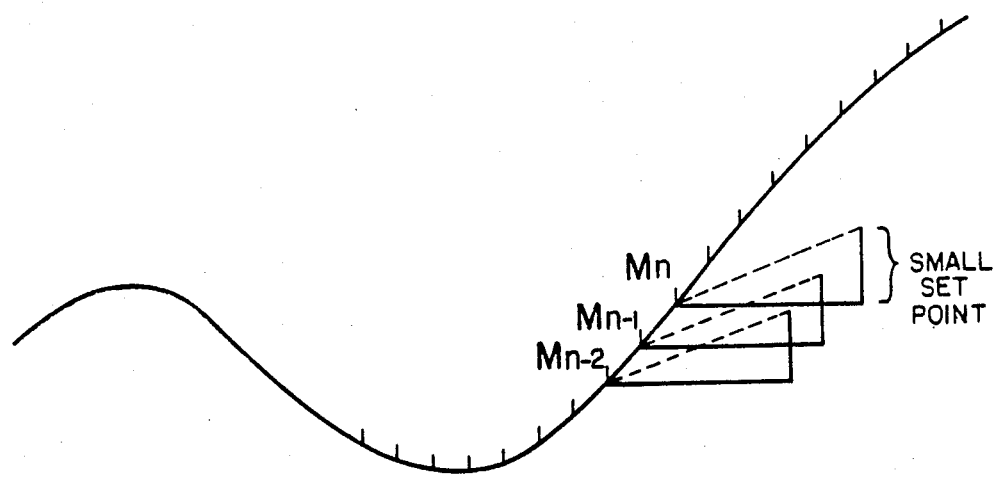
FIG. 9 illustrates schematically the preferred technique for confirming that the increase in the value of the waveform derivative, above the minimum value as adjusted by the setpoint, is a true indication of latch movement to the desired final position.

FIG. 9 shows a further refinement of the technique to prevent premature indication of latch engagement. Instead of adding a very conservatively chosen set point slope to the stored value, as shown in FIGS. 7a and 7b, a smaller set point value is chosen but the real-time value of the derivative must exceed the mimimum value plus the smaller set point, on three successive time interval comparisons, shown as slopes $M_{N-2}, M_{N-1},$ and $M_N$ in FIG. 9.

The essential features of the invention have been described with reference to FIGS. 1-9, but for a preferred practical implementation, a variety of potential sources of error should be accounted for. The first source of error arises when the three-phase voltage power source 30 becomes unbalanced. Thus, the technique for implementing the invention as described up to this point, should not only take into account that the gross waveforms shown in, for example, FIGS. 7 and 8 have a low amplitude sinusoidal component, but that the sinusoidal component may in fact vary in amplitude and frequency. FIGS. 10 and 11 illustrate the technique for taking these sources of error into account.

Figure 10B:
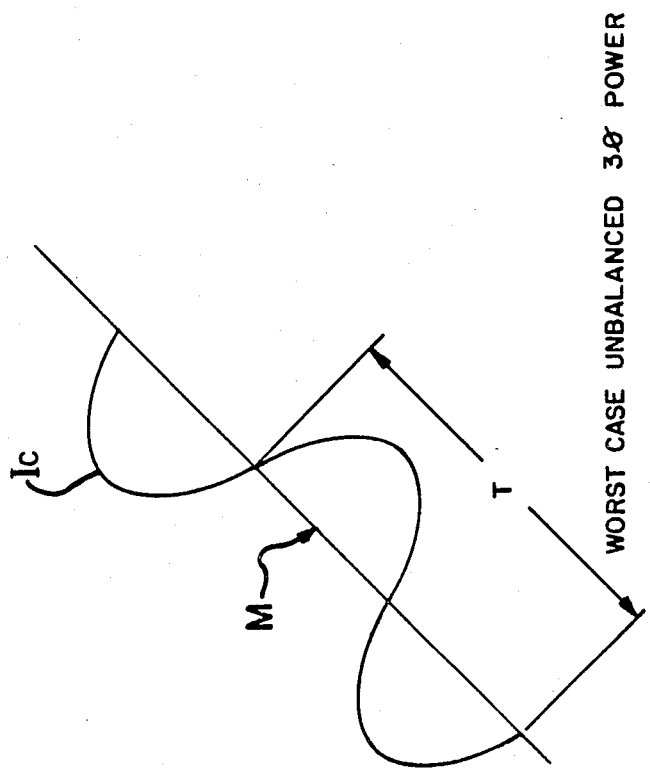
FIGS. 10a and 10b illustrate schematically in a different scale, the current constituting the gross waveforms of the types shown in FIGS. 5-9, resulting from a balanced and unbalanced three-phased power source, respectively.
Figure 10A:
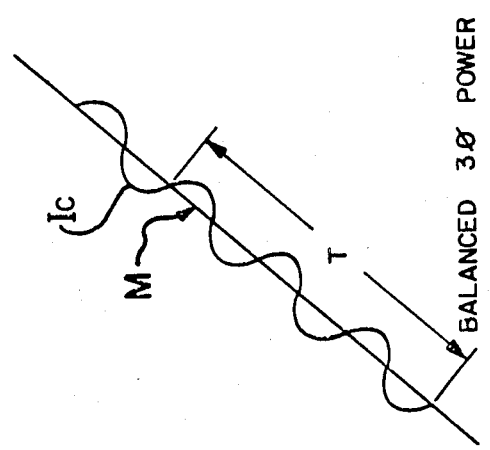

FIG. 10 schematically illustrates the coil current $I_C$ associated with a balanced three-phase drive voltage source, whereas FIG. 10b illustrates the situation for the worst case of an inbalanced three-phase power source. These waveform portions might be found on any portion of the gross waveforms discussed above. The most common power source in nuclear power plants is a three-phase power supply voltage at 180 cycles per second (cps). In this situation, it has been found that the preferred technique is to digitize the current waveform and determine average slopes.

FIGS. 11a and 11b illustrate how the preferred averaging technique would be implemented. Waveform analog to digital conversion is made at 0.5 ms intervals, but the value of the gross waveform derivative is determined by taking the difference between average waveform amplitudes at 16 ms intervals, where each of the average amplitude values is determined by averaging the amplitude values over a time interval of 8 ms. As can be seen by a comparison of FIGS. 11a and 11b, this averaging technique properly weights the contributions of the waveforms whether in the balanced three-phase situation or in the unbalanced three-phase situation. In effect, the average derivative is determined for a time interval equal to three times the period of the balanced three-phase power supply.

Another source of error arises from spurious amplitude signals that result from EMI. FIG. 12 illustrates the technique for minimizing the effects of such spurious data. The current waveform is digitized at 0.5 ms intervals, but before the value sensed at each such interval is used in the calculation of the waveform derivative, a check is made to assure that the value falls within a predetermined range or band above and below the preceding data. For example, at time $T_1$ the amplitude is 12 amps. A band of plus or minus four amps is then established for the next time point $T_2$ such that the measured amplitude at $T_2$ must fall within the range R 8-16 amps, or else it will be assigned the default value $I_D$ corresponding to the immediately preceding time point, i.e., 12 amps. Other techniques for implementing a band could also be used, such as assuming a particular sinusoidal shape for the current waveform and superimposing a sinusoidal band having a suitable range. In any event, measures should be taken to prevent excessive weighting of a spurious signal to the determination of the derivative of the gross coil current waveform.

Other measures may also be taken to prevent inclusion of spurious signals into the calculation of the waveform derivative. For example, with reference to FIG. 5, waveform measured values are not included in the derivative calculation until the coil current $I_C$ exceeds a predetermined minimum value $I_M$, or no current value is included until a minimum time $T_M$ elapses.

Another feature of the present invention considered important in minimizing the introduction of noise into the system operation, is the use of Hall effect sensors for monitoring the coil current signals. These sensors provide inherent isolation of control logic power from EMI intensive coil power. Coils operate on 240 vac which is half-wave rectified through phase fired silicon control rectifiers. Suitable Hall effect sensors are available from, for example, the Texas Instruments Company as model number TL 173C. They should be located within a magnetic flux concentration (e.g., ferrite core), which in turn is located around one of the power supply leads to each coil.

The preferred hardware implementation of the invention will now be more fully described with reference to FIG. 14. The block diagram represents the control function for a single control element drive mechanism having the five coil types actuated in accordance with the timing scheme shown in FIG. 2. For each coil or coil circuit type, there is an associated sensing means 44 (i.e., a different Hall effect sensor for each of the upper gripper coil 20, lower gripper coil 26, lift coil 18, load transfer coil 24 and pulldown coil 22). The sensor signals pass through conventional filters 56 and amplifiers 58 before entering the signal processing means 46 consisting of a multiplexing device 60 and an analog to digital converter 62. The digitized waveforms are entered on the data bus 64 where they are accessed by the microprocessor control unit 48. Preferably, all of the method steps discussed in connection with FIGS. 7-12 are performed by the microprocessor, although some functions, particularly those pertaining to noise screening, could be performed in the signal processing unit 46. The oscillator 66 and external timer 68, in conjunction with the programmable read-only memory unit 70, interact with the microprocessor 48 in a conventional manner to establish a common real-time frame of reference for the microprocessor interaction with the data bus 64, address bus 72 and control bus 74. In the preferred embodiment, a second oscillator 76 and watchdog timer 78 interact with a random access memory unit 80 to "catch" any microprocessor based operations that fail to terminate within a predetermined time period.

The watchdog timers of the present invention are preferably programmed such that upon timing out, control signals 82 initiate holding current applied to both the upper and lower grippers to avoid a potential rod drop. Since this current level will only hold the engaged gripper and will not engage a disengaged gripper, the microprocessor 48 must then determine which gripper is actually engaged. This is accomplished by sequentially energizing the gripper coils while looking for a waveform corresponding to latch engagement. By thus determining which gripper is engaged, the microprocessor's internal status flags can be reset to the actual set of initial conditions extant when the watchdog timer ran out. Thus, automatic reset can be accomplished without dropping the control rod.

As previously discussed in connection with FIG. 2, the timing and sequencing of the voltage signals to the various coils is dependent on confirmation that the action required during the previous time interval has in fact occurred. In accordance with the present invention, such confirmation is determined in the microprocessor 48 by the comparison of the real-time derivative of the coil current with the minimum derivative associated with the earlier portions of the current waveform generated during the voltage pulse. The microprocessor 48 thus sends signals through the control bus 74 to the input/output ports 52 which in turn control the drive voltage to the coils. The various control actions undertaken by the microprocessor include lift coil high voltage (LH), lift coil low voltage (LL) load transfer coil high voltage (LTH) load transfer coil low voltage (LTL) pulldown coil high voltage (PDH) upper gripper high voltage (UGH) upper gripper low voltage (UGL) lower gripper high voltage (LGH) lower gripper low voltage (LGL). Also, a pulse count signal is sent to the plant computer to indicate that a given control rod has moved (LHL), and the failure hold sequence 84 is actuated when the watchdog times out.

It should be understood that a higher level of control is provided in the control rod drive system, to coordinate the motion of subsets of the approximately 100 control rods and associated drive mechanisms that are provided on a typical nuclear reactor unit. This higher level control is conventional and does not form a part of the present invention. It should be appreciated, however, that although the higher level of control logic and system is conventional, the present invention enables the master controller to operate with greater reliablity and precision due to the relatively error-free operation of the individual control element drive mechanisms.

Figure 13B:
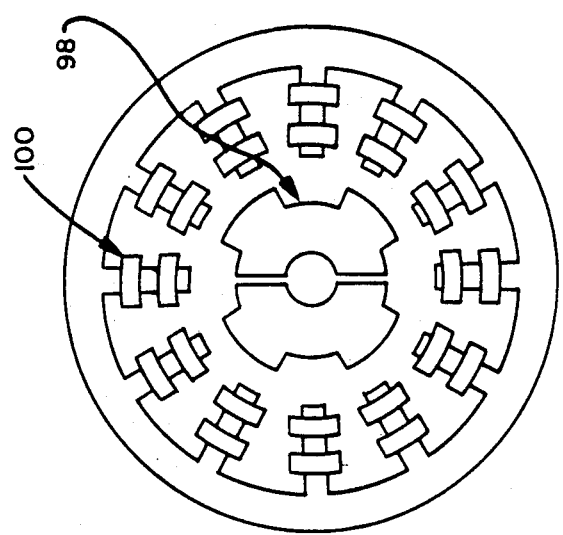
FIGS. 13a and 13b are schematic representations of an electro-mechanical control element drive system in which the rod is advanced by rotation of a roller nut about a lead screw drive shaft.
Figure 13A:
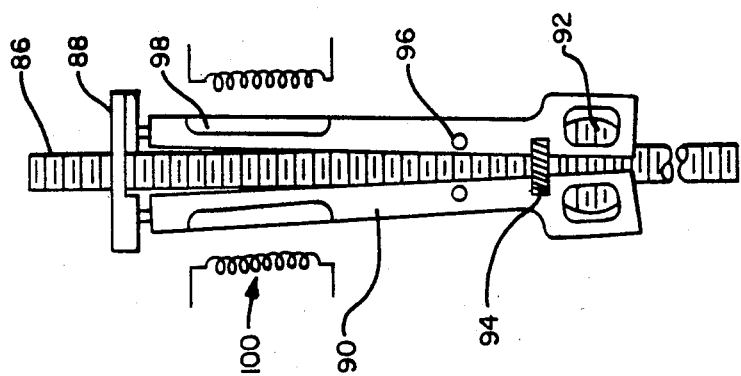

Another embodiment of the invention is shown schematically in FIGS. 13a and 13b. FIG. 13a is an elevation view of a roller nut type of control rod drive mechanism. A lead screw drive shaft 86 is surrounded by a synchronization ring 88, segment arms 90, and roller nut 92. In the engaged position shown in FIG. 13a, the segment arm lower position bears upon the roller nut 92 such that as the segment arms 90 are rotated about the shaft 86, the roller nut turns and advances the shaft to which it is threadedly engaged. The compression spring 94 and pivot pins 96 assist in the intentional disengagement when the rod is to be scrammed. The segment arms 90 are rotated by means of a timed electromechanical interaction between magnetic stainless steel rotors 98 on the segment arms 90, and a plurality of induction or stator coils 100 spared about the arms 90.

FIG. 13b shows in plan view, the spatial relationship between the segment arm rotors 98 and the coils 100. By energizing the coils in a carefully timed sequence, the rotor and roller nut can be made to rotate either clockwise or counterclockwise, while a radially outward force on the upper portion of the arms maintains the engagement of the roller nut against the shaft.

Those skilled in this art will thus appreciate that the movement of a rotor 98 relative to stationary coil 100 will produce a current waveform of a type that can be used in accordance with the present invention, to perform monitoring or control functions. It will further be appreciated that the invention is not limited to use in connection with nuclear control rod drive mechanisms.

We claim:

1. In an apparatus comprising means for applying a voltage, a circuit connected to the voltage means for allowing a current to flow when the voltage is applied by the voltage means, the application of voltage thereby causing a magnetic field, an armature arranged to move from a first substantially stationary position to a second substantially stationary position in response to the magnetic field, means for sensing the current flowing in the circuit and generating an output indicative of the amount of current flow, and means, connected to receive the output of the sensing means, for comparing the waveform of the current level in the circuit to a waveform that is characteristic of the circuit when the armature is at rest and for indicating whether the current waveform is departing from the shape of waveform characteristic of the circuit when the armature is at rest, the indication thereby permitting armature motion to be monitored, the improvement comprising: said means for comparing the waveform of the current level in the circuit to a waveform that is characteristic of the circuit when the armature is at rest including, means for continually generating data values indicative of the time-dependent waveform of the current level in the circuit during application of said voltage;

means for selecting and storing one of said data values as representing a value limit characteristic of said waveform during the time when the armature has not reached the position to be monitored;

means for comparing the most recently generated data value to said value limit; and means for generating a control signal when the most recently generated data value exceeds the value limit.

2. The improved apparatus of claim 1 wherein said data values indicate the time derivatives of said waveform at a plurality of predetermined times during the application of said voltage.

3. The improved apparatus of claim 2 wherein said value limit is the minimum algebraic value of the time derivative of said waveform from among said continually generated values.

4. The improved apparatus of claim 3 wherein said means for comparing the most recently generated data values compares the algebraic values of the most recently generated data value to the value limit.

5. The improved apparatus of claim 2 wherein said data values indicate the average time derivative of said waveform during a predetermined time interval centered about each of said predetermined times during the application of said voltage.

6. The improved apparatus of claim 1 wherein said means for continually generating data values includes means for digitally representing the current waveform at each of a plurality of predetermined times during the application of said voltage, and means for averaging said digitized representations over each of a preselected plurality of time intervals.

7. The improved apparatus of claim 6 wherein said means for averaging said digitized representations includes means for limiting the magnitude of the deviation of any digitized representation relative to preceding digitized representations of said waveform.

8. The improved apparatus of claim 6 wherein said data values indicate the time derivatives of said waveform at a plurality of predetermined times during the application of said voltage.

9. The improved apparatus of claim 8 wherein said value limit is the minimum algebraic value of the time derivative of said waveform from among said continually generated values.

10. The improved apparatus of claim 9 wherein said means for comparing the most recently generated data value compares the algebraic values of the most recently generated data value and the value limit.

11. A method of controlling the operation of a stepping-type magnetic mechanism having a plurality of magnetic coils disposed about a drive shaft and a plurality of movable latch members actuated by said coils in a predetermined sequence to impart longitudinal or rotational motion to said drive shaft, comprising the steps of:

generating a drive voltage across a first said coil sufficient to cause a first latch to remove from a predetermined initial position to a predetermined final position;

sensing the current waveform produced in said first coil by said drive voltage;

continually monitoring the time derivative of said current waveform at each of a plurality of time points during the application of said drive voltage;

storing the minimum algebraic value of the time derivative of said current waveform;

comparing the algebraic value of the present time derivative of the current waveform to said stored value;

generating a control signal when the algebraic difference between the present value and the stored value exceeds a predetermined setpoint.

12. The method of claim 11 further including the steps of repeating each of the steps set forth in claim 11 for each of the coils in said magnetic mechanism, in said predetermined sequence to impart longitudinal or rotational motion to said drive shaft.

13. The method of claim 12 wherein the step of generating a control signal is taken only after three successive steps of comparing the present time derivative of the current waveform with the same mimimum algebraic value of the current waveform derivative.

14. A method of controlling the operation of a stepping-type magnetic mechanism of the type having a magnetic coil and an adjacent armature member movable in response to changes in the magnetic field surrounding said coil, further including a power source having three phase alternating voltage signals imposed upon said coil of a magnitude sufficient to cause the armature to move from a predetermined initial position to a predetermined final position, wherein said method comprises the steps of:

generating a drive voltage across the coil;

sensing the current waveform produced in the coil by said drive voltage;

digitizing the current waveform to obtain a digitized current amplitude value at a rate at least four times the frequency of the three phase power source when the phases are in balance;

averaging the digitized amplitudes over preselected time intervals to determine the average time derivative of said current waveform during the application of said voltage;

continually storing the minimum algebraic value of the time derivative of said waveform;

continually comparing the present value of the time derivative of said waveform with said stored value;

generating a control signal when the algebraic value of said present time derivative exceeds the algebraic value of said stored derivative by a predetermined setpoint.

15. The method of claim 14 wherein the balanced three phase power supply voltage is 180 cycles per second and wherein the step of digitizing the current amplitude is performed at 0.5 ms intervals.

16. The method of claim 15 wherein the time duration over which each average derivative is calculated, is equal to three times the period of the balanced three phase power supply.

17. The method of claim 15 in which the derivative of the current waveform is calculated for real time intervals of 16 ms.

* * * * *